UNITED STATES PATENT OFFICE.

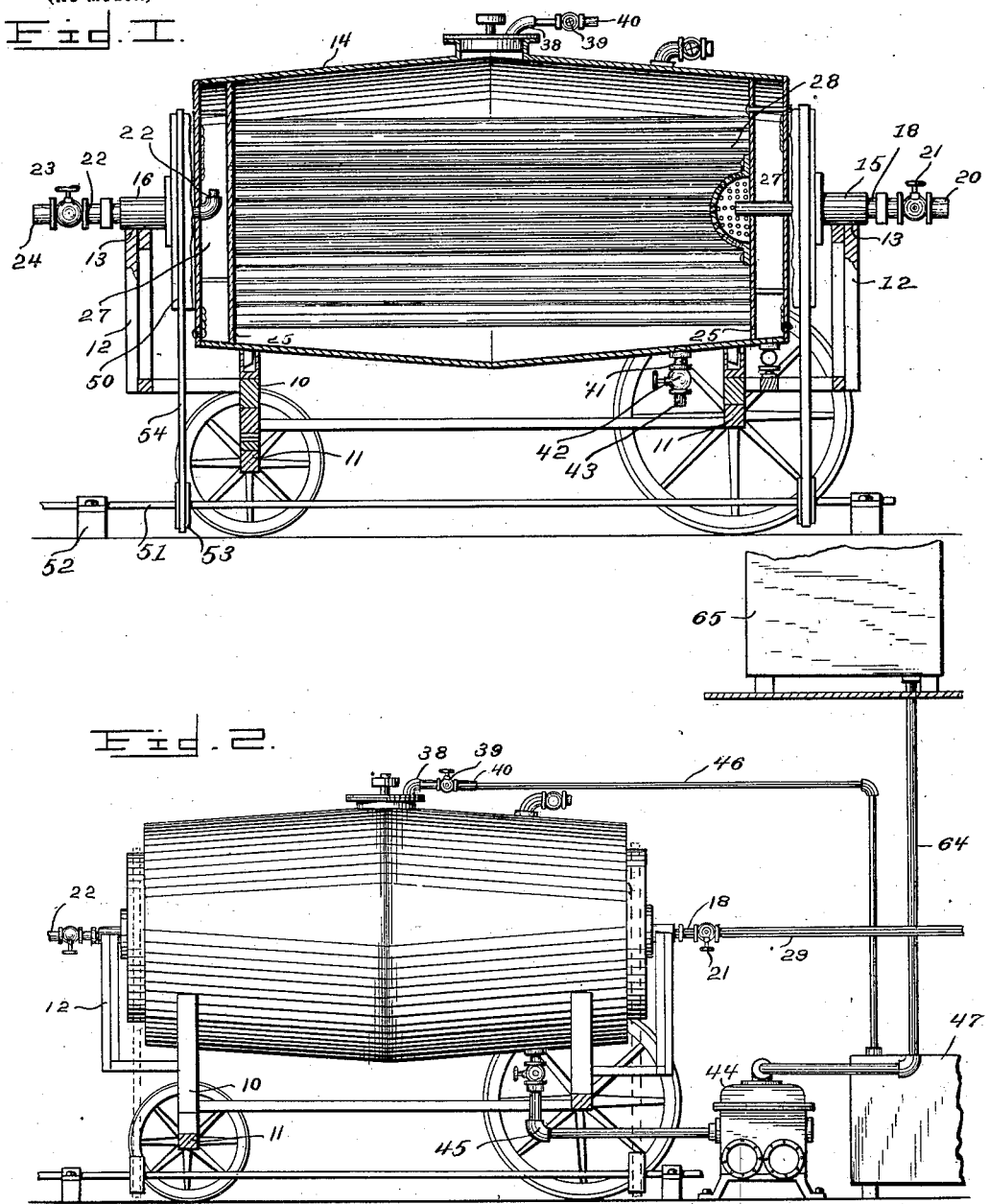

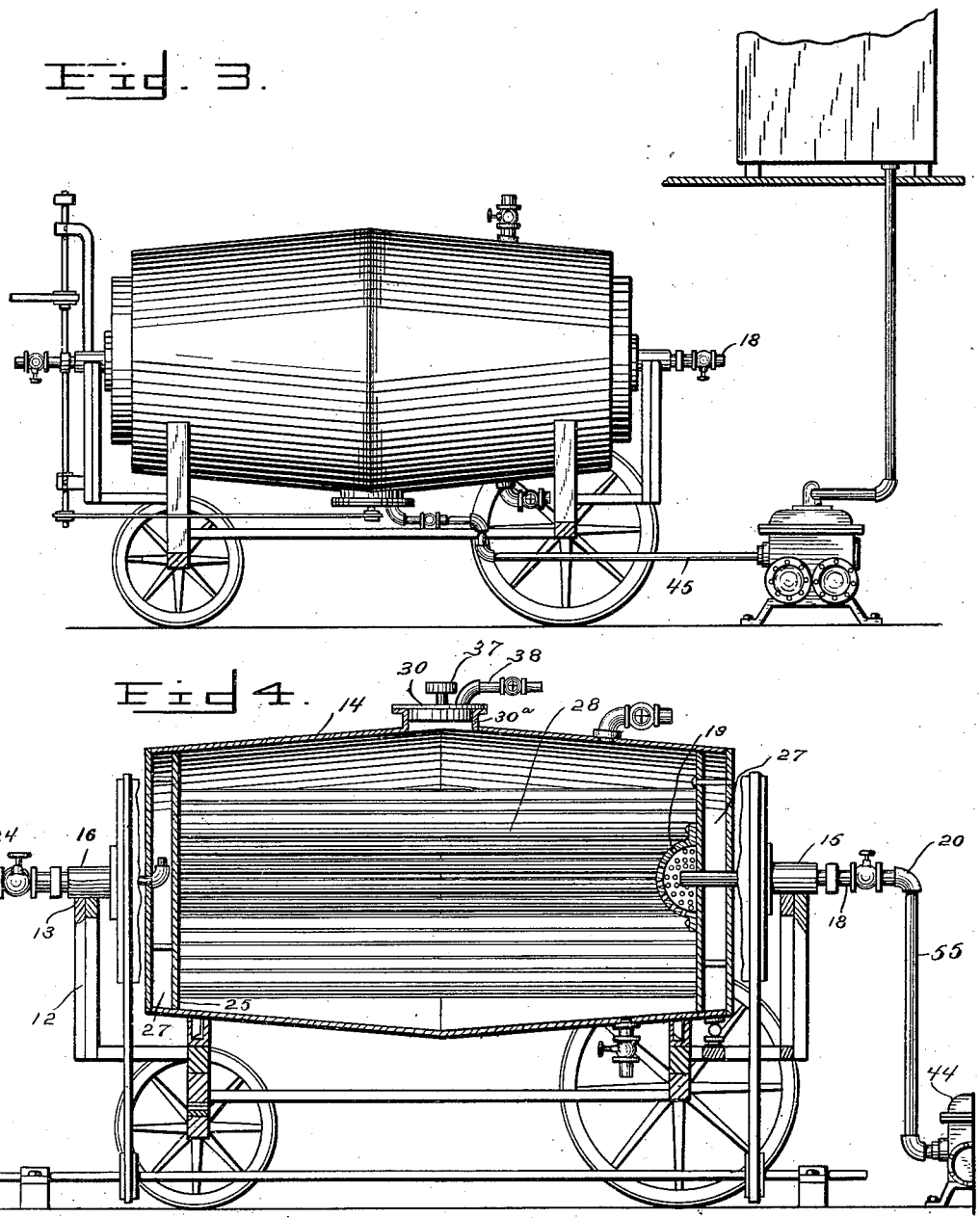

ROBERT KERR GIFFEN, OF WHEELING, WEST VIRGINIA.

METHOD OF MAKING FERTILIZERS.

SPECIFICATION forming part of Letters Patent No. 673,167, dated April 30, 1901.

Original application filed December 8, 1898, Serial No. 698,632. Divided and this application filed February 5, 1900. Renewed April 3, 1901. Serial No. 54,226. (No specimens.)

*To all whom it may concern:*

Be it known that I, ROBERT KERR GIFFEN, a citizen of the United States, residing at Wheeling, in the county of Ohio and State of West Virginia, have invented a new and useful Method of Obtaining Fertilizer from Waste Materials, of which the following is a specification.

The subject-matter of this application, which relates to a method of obtaining fertilizer from waste materials, constitutes a division of a prior application for Letters Patent for an improved apparatus for making fertilizer from garbage filed by me on December 8, 1898, Serial No. 698,632, for which Letters Patent of the United States No. 638,919 were granted to me December 12, 1899.

One purpose of the invention is to effect the treatment of garbage, butchers' offal, night-soil, dead animals, and other refuse from cities in an economical, sanitary, and expeditious manner.

A further purpose of the invention is to extract from the substance under treatment the grease and oils, which are valuable in the manufacture of soap and in other arts, and to treat the residue or solid matter in order to extract all liquid matter therefrom and obtain as a product ammoniated fertilizer which, under certain steps of treatment continued in the apparatus, is converted into commercial fertilizer.

The invention consists in cooking and agitating such refuse substances as herein described to reduce the mass to a pulpy or comminuted condition; then effecting the separation of the grease and oil from the mass by forcing therein a strong or concentrated brine solution which, owing to its being of greater specific gravity than the grease, tends to carry off such grease and oils from the pulpy mass and to effect to a marked degree the separation of the grease from the brine solution; then expressing the brine and liquid matters from the pulpy residue by creating a vacuum in the vessel in which the treatment is effected and securing a product of ammoniated fertilizer; then admitting other fertilizer agents to the residue of the mass, and finally agitating and drying the residue and the substances mixed therewith to produce commercial fertilizer.

The invention further consists in the novel steps of process, as will be hereinafter fully described and claimed.

As one means for carrying the process into practice I have illustrated in the accompanying drawings a portable apparatus which forms the subject-matter of my prior patent, to which reference has been made.

Figure 1 is a sectional elevation of the apparatus adapted for service in carrying the first step of the process into effect. Fig. 2 is a side elevation of the tank connected operatively with appliances for treating the contents of the tank. Fig. 3 is a side elevation of the apparatus with the tank in its reversed position to Fig. 2 and showing the apparatus connected with a pump for exhausting the liquid matter and the separating solution from the tank, so as to create a vacuum therein for the more efficient expression of the liquid from the solid residue. Fig. 4 is a sectional elevation with the tank in its upright position, adapted for the reception of certain fertilizer elements for admixture with the solid residue, which constitutes the ammoniated fertilizer within the tank, and also showing the adaptation of the tank as the means for drying and for mixing the fertilizer elements.

Like numerals of reference denote corresponding parts in the several figures of the drawings.

As one means for carrying my invention into practice I have represented an apparatus of the portable type which includes a tank mounted on a wheeled truck and adapted to serve the purpose of a collecting vessel to receive the waste materials and refuse which are to be treated according to my invention for the purpose of extracting greasy and oily matters from such waste materials and also to obtain a solid residue in the form of ammoniated fertilizer, which may be converted into commercial fertilizer by admixture therewith of certain other fertilizing agents. The several steps to which the waste material is subjected when it is treated in accordance with my invention may all be effected in the tank or vessel of the portable collecting apparatus, whereby the latter is adapted for the collection and treatment of the waste materials in an economical, sanitary, and expeditious manner and without involving the transfer of such refuse or waste materials from a collecting vessel to treatment vessels. While this apparatus may be used to carry out the process, I would have it distinctly understood that I do not confine myself to the practice of my process in a portable apparatus adapted for the collection of waste materials, because it will be evident that the advantages of my invention may be obtained by the employment of a stationary plant or apparatus to which the waste materials may be transported and discharged after collection thereof by a suitable vehicle.

I will now describe the apparatus shown by the drawings, in which the numeral 10 indicates a suitable truck or frame which is carried by the wheeled axles 11. The truck-frame is equipped with pillow-blocks 12, having journal-bearings 13, adapted to receive the journals or trunnions 15 16 of the tank or vessel 14, which is revolubly mounted on the portable truck. These journals are hollow or tubular to provide for the admission of steam as the heating medium to the interior of the tank, and said journals are in axial alinement with each other, so as to support the tank on the truck in a manner to permit its rotation as required by certain steps in the treatment of the waste material. The steam necessary to cook the contents of the tank is supplied by a superheated steam-pipe 18, which is arranged or extended axially through the journal 15 at one end of the tank, and the short section of steam-pipe 18 extends through one of the tank-heads and a partition adjacent thereto, so as to have its delivery end terminate in the interior chamber of the tank. The mouth or orifice at the delivery end of the pipe 18 is covered by a screen 19, which permits the free passage of the steam while excluding particles of a pulpy mass within the tank from passing into the pipe, said screen being particularly serviceable when the steam-supply is cut off and the separating solution is pumped into said tank. Said pipe 18 is extended beyond the journal 15 for the reception of a coupling 20 for uniting said pipe with a steam-supply pipe or with a pipe leading to a vacuum-pump. Said pipe 18 is, furthermore, provided with a suitable stop-cock or valve 21. The hollow journal 16 at the opposite end of the revoluble tank has a steam-pipe 22, the inner end of which communicates with a heating-chamber at said end of the tank, and said pipe 22 is also provided with a cock or valve 23 and with a coupling 24, the latter being located at the exposed end of the pipe for the purpose of uniting the same with a superheated steam-supply pipe, so that steam may be fed to the circulating-chambers and the tubes of the revoluble tank.

Within the tank, near the ends thereof and parallel to the heads which close the ends of the tank, are provided the partitions 25, which form the steam-circulating chambers 27, into one of which chambers steam is discharged from the pipe 22. These partitions are joined by an annular series of circulating-pipes 28, which are arranged longitudinally of the tank to extend through the refuse-treating chamber thereof. The circulating-chambers 27 and the flues 28 provide the means for the circulation of superheated steam for the purpose of heating the refuse-treating chamber of the tank, so as to facilitate drying of the ammoniated fertilizer, which is the product remaining in the tank after the grease and oily matters shall have been eliminated from the pulpy mass of residue and the separating solution and liquid matters shall have been expelled therefrom. For cooking the waste material and refuse a steam-pipe 29 is adapted to be coupled to the pipe 18 by means of the coupling 20, and as one means for superheating the steam to the required temperature I may mention that the battery of boilers provided for the generation of steam may be equipped within the fire-box thereof with a coil, through which the steam from the boilers is conducted previous to supplying the same to the pipe 29.

The tank is provided on one side with a central manhole 30ª, which is closed by a cover 30, and said cover is provided with a threaded opening 37, into which is screwed a short off-bearing pipe 38. Said pipe has a stop-cock 39, and its free end is equipped with a coupling 40 for the purpose of uniting the pipe 38 to a pipe adapted to conduct the grease and oily matters to a suitable storage-tank.

The revoluble tank 14 is provided in its side opposite the manhole with an inlet-pipe for the admission of the separating solution, said pipe 41 being secured at a point between the circulating-chambers 27 for communication with the treatment-chamber of the tank. Said inlet-pipe has a stop-cock 42 and a coupling 43.

To supply the separating briny solution to the tank 14, I provide a pump 44, which serves not only as the means for forcing the solution into the tank 14, but also as the means for extracting said solution and liquid matters from the pulpy mass and for creating a vacuum in the tank and also for exhausting the foul odors which arise from the pulpy mass during the operation of drying the residue and of mixing fertilizer ingredients therewith. Said pump 44 has a feed-pipe 45, which is united by a coupling 43 to the inlet-pipe 41, whereby said pump may be connected operatively with the tank 14.

A grease-pipe 46 is provided in an elevated position for connection with the off-bearing pipe 38 through the medium of a coupling 40, said grease-pipe being carried to a suitable tank 47, which is provided for the storage of greasy and oily matters extracted from the refuse under treatment. This grease and oil has commercial value in that it may be used in the manufacture of soap or in other arts.

The tank 14 is designed to be rotated on its axis in practicing certain steps of my process, and as one adaptation of means for rotating the tank I have shown the latter equipped with driving-pulleys 50, located, preferably, near the opposite ends of the tank. A horizontal shaft 51 is arranged longitudinally of the apparatus, preferably below the tank 14, said shaft being journaled in bearings 52. The shaft has pulleys 53 disposed in the vertical planes of the pulleys 50, and endless belts 54 are fitted to these pulleys 50 53. Although I have described pulleys and belts as the gearing for connecting the driving-shaft to the tank, it is evident that spur-gearing or sprocket-gearing may be substituted therefor, and it is also evident that the shaft for driving the tank may be provided either on the truck-frame or supported in suitable bearings at the plant or station where the materials are subjected to treatment.

In the course of treatment of the contents of the tank it becomes necessary to dry the ammoniated fertilizer remaining as a solid product in said tank, and to expeditiously dry this solid residue it is my purpose to rotate the tank on its axis and at the same time create a suction from the tank through the pump in order to carry off the foul odors which arise from the residue. This exhaustion of the odors may be effected conveniently by a pipe 55, which is adapted to be coupled at 19 with the short pipe 18 and also with the pump 44.

The operation of the apparatus for the practice of my process may be described as follows: After the tank shall have been charged or filled with the refuse or waste material the superheated steam-pipe 29 is united by the coupling 20 to the short pipe 18, which discharges steam through the screen 19 into the treatment-chamber of the tank. The steam is admitted by said pipes until the steam-pressure in the tank is equal to the steam-pressure in the boilers, and the communication between the tank and the boiler is kept open during the rotation of the tank and while the cooking step of the process is being conducted. The means for rotating the tank, consisting of the shaft 51 and the gearing, are now set in motion by any suitable connection with a source of power, and the tank 14 is thus rotated on its axis, whereby the contents of the tank are agitated and cooked until the mass is reduced to a pulpy comminuted condition. The driving mechanism is then arrested and the tank is brought to a state of rest, in which condition it is allowed to remain for a short period—say from twenty to thirty minutes—in order to permit the solid portion of the mass to settle to the bottom of the tank. The next step in the treatment of the waste material consists in forcing a separating solution, preferably of strong or concentrated brine, into the tank for the purpose of floating the grease and oil and of effecting the thorough separation of the greasy and oily matters from the liquid and the solid particles of pulp contained in the comminuted cooked mass. I prefer to employ this strong or concentrated solution of brine, because its high specific gravity has a tendency to thoroughly separate the grease and oil from the liquid matters, and it obviates commingling of the grease with the solution which is forced into the pulpy mass, and this brine solution also increases the value of the solid residue as a fertilizer agent because of the absorption by the residue of saline properties from the brine solution. When the pump is to be connected with the treatment-tank 14, the latter is turned to the position shown by Fig. 2, so that the manhole-cover 30 lies on the upper side of the tank, and the pipe 45 is united by the coupling 43 to the brine-pipe 41. The pump is also connected by a pipe 64 with a tank 61, from which tank the brine may be drawn, and when the pump is in operation the brine is forced through the pipes 45 41 into the tank 14 until the latter is filled. The valve 39 in the pipe 38 is opened for the grease and oil to pass through the pipe 46 into the grease-tank 47. The next step in the treatment of the refuse consists in drawing off the brine and liquid matters from the pulpy mass in the treatment-tank 14, and to effect this operation the valve 39 is closed, the grease-pipe 46 is uncoupled from the pipe 38, and the tank is partly turned on its axis to bring it into the inverted position shown by Fig. 3 of the drawings. At this stage the pipe 45 is united to the coupling 40 and the pipe 38, and thus the pump is connected operatively with the manhole-cover of the treatment-tank, said pump being connected by the pipe 64 with the elevated brine-tank 61. The pump is now operated to draw the brine and liquid matters from the treatment-tank and force the same into the elevated brine-tank 61, in which the brine is stored until it is desired to use the brine again in the treatment of another charge of material. The operation of pumping is continued after the brine and liquid matter shall have been drawn off from the solid residue and until the air shall have been exhausted from the tank, so as to attain a vacuum therein, the force exerted by which is equal to about forty pounds to the square inch. The maintenance of this vacuum expels all the liquid matter from the solid residue, thus leaving the latter in a condition free from liquid and suitable for the final step in the treatment of the waste material. The pump is disconnected from the tank and the latter is turned by the driving mechanism to its normal upright position. (Shown by Fig. 4 of the drawings.) While in this condition the manhole-cover is removed, and fertilizing agents, such as acid phosphates and potash, are deposited in the tank for admixture with ammoniated fertilizer, the latter formed by the solid residue. Such admixture of the acid phosphates and potash with the ammoniated fertilizer produces a good quality of commercial fertilizer. The manhole-cover is now applied, the pipe 55 is coupled with the pump and with the pipe 18, and the pipe 22 is connected with a superheated steam-pipe 65 in order to supply steam to the chambers 27 and the flues 28 of the treatment-tank, thereby heating the latter and the substances contained therein. The driving mechanism and the pump are now set in operation for the purposes of rotating the treatment-tank on its axis and of exhausting the foul odors from the tank, and these odors may be forced by the pump into the combustion-chamber of a furnace or discharged into a sewer or other place. The rotation of the treatment-tank insures the intimate admixture of the fertilizing agents, which are introduced into the tank, with the residue of ammoniated fertilizer. The agitation of the contents of the tank not only secures the admixture of the ingredients, but they are better exposed to the action of the heat, and as the pump exhausts the foul odors and a portion of the heat a circulation is secured through the tank, which tends to facilitate the operation of drying the residue. The pump and the superheated steam-pipe are now disconnected and the revoluble tank is inverted, so that the cover 30 may be removed for the purpose of dumping the fertilizer into an elevator-pit, by which such fertilizer may be carried to a screen, after which the stock fertilizer may be stored in a warehouse or packed in sacks for shipment or storage.

Having thus described the invention, what I claim is—

1. The process of treating refuse substances which consists in cooking a mass to reduce it to a pulpy condition, separating grease and oil from the mass by forcing therein a separating solution, expelling such separating solution and liquid matters from the pulpy mass, mixing fertilizer agents with the solid residue of the mass, and finally agitating and drying the residue and effecting a thorough mixture of such residue with the fertilizer agents, substantially as described.

2. A process of treating refuse substances which consists in cooking a mass of refuse to reduce it to a pulpy condition; forcing into the mass a solution to separate the grease from the solid residue; discharging the grease and solution from the residue; removing liquid matters from the residue to reduce the latter to a relatively dry condition; admitting fertilizer agents to the residue, and agitating the residue and fertilizer agents in the presence of heat to dry the residue and intimately combine the same with the fertilizer agents, as set forth.

3. As an improvement in the art of treating refuse materials of the character described, the process herein set forth consisting of admitting to a pulpy mass a separating solution of higher specific gravity than the liquid or semiliquid contents of said mass, thereby separating grease and oil from the mass; discharging the solution, and expelling liquid matter from the solid residue by exhausting the air to create a vacuum, as set forth.

4. As an improvement in the art of treating refuse materials of the character described, the process herein set forth which consists in cooking and agitating a mass of refuse substances; admitting to the cooked mass a separating solution of higher specific gravity than the liquid or semiliquid contents of the mass, thereby separating greasy and oily matters from the mass; discharging the solution; expelling liquid matters from the solid residue, and drying the solid residue by exposing the same to a circulating current of heated aeriform fluid while the residue is in an agitated condition, as set forth.

5. As an improvement in the art of treating refuse materials of the character described, the process herein specified which consists in cooking a mass of refuse substances; admitting to the cooked mass a separating solution of higher specific gravity than the liquid or semiliquid contents of the mass; discharging the solution; expelling liquid matters from the solid residue of the mass; mechanically agitating the solid residue; exhausting the odors from the solid residue while it is in an agitated condition, and finally drying the solid residue during the period of its agitation and the exhaustion of odors from the residue by establishing a circulation of heated aeriform fluid through the residue, as set forth.

6. As an improvement in the art of treating refuse materials of the character described, the process herein set forth consisting of cooking a mass of refuse substances; admitting to the cooked mass a separating solution of higher specific gravity than the liquid or semiliquid contents of the mass, thereby separating greasy and oily matters from the mass; discharging the solution; expelling liquid matters from the solid residue and obtaining a product of ammoniated fertilizer; admitting other fertilizer agents to the product of ammoniated fertilizer; mechanically agitating the fertilizer ingredients, and finally drying said ingredients by establishing a circulation of heated aeriform fluid through the same, as set forth.

7. As an improvement in the art of treating refuse materials of the character described, the process herein set forth which consists of admitting to a pulpy mass a concentrated brine solution, thereby separating grease and oil from the mass; discharging the solution, and expelling liquid matter from the solid residue, substantially as and for the purposes set forth.

8. The method of treating refuse materials of the character described, consisting in reducing the same by cooking to a semiliquid mass, separating the grease and oils therefrom by admitting a solution of different specific gravity to said semiliquid mass, agitating the residue and drying the same while agitated.

In testimony that I claim the foregoing as my own I have hereto affixed my signature in the presence of two witnesses.

ROBERT KERR GIFFEN.

Witnesses:
GEORGE HOOK,
GEORGE W. LUTZ.